United States Patent [19]

Watanabe et al.

[11] Patent Number: 4,644,583
[45] Date of Patent: Feb. 17, 1987

[54] METHOD OF IDENTIFYING CONTOUR LINES

[75] Inventors: Yuji Watanabe; Kozo Kato, both of Hirakata, Japan

[73] Assignee: Kabushiki Kaisha Komatsu Seisakusho, Tokyo, Japan

[21] Appl. No.: 691,016

[22] Filed: Jan. 14, 1985

[30] Foreign Application Priority Data

Jan. 13, 1984 [JP] Japan .................................. 59-4451
Feb. 15, 1984 [JP] Japan .................................. 59-26580

[51] Int. Cl.$^4$ .............................................. G06K 9/48
[52] U.S. Cl. .................................... 382/22; 382/25; 358/107; 356/376
[58] Field of Search ............... 358/107, 101; 382/25, 382/68, 21, 22; 356/376, 377, 384, 387, 386

[56] References Cited

U.S. PATENT DOCUMENTS

| | | | |
|---|---|---|---|
| 4,017,721 | 4/1977 | Michaud | 358/107 |
| 4,021,778 | 5/1977 | Ueda et al. | 382/25 |
| 4,115,761 | 9/1978 | Ueda et al. | 382/25 |
| 4,228,432 | 10/1980 | Osborne | 315/378 |
| 4,361,830 | 11/1982 | Honma et al. | 358/107 |

*Primary Examiner*—Leo H. Boudreau
*Assistant Examiner*—Jose L. Couso
*Attorney, Agent, or Firm*—Diller, Ramik & Wight

[57] ABSTRACT

A contour line of a circle or an object having a configuration close to a circle or a portion thereof is identified by presuming picture image data representing a contour candidate point of the object to be detected among picture image data representing the brightness of one picture in which the object presents, and then scanning the picture image data of a predetermined region containing the picture image.

6 Claims, 26 Drawing Figures (a)

(b)

(c)

(d)

(a)

(b)

(a)

(b)

(c)

(d)

(e)

METHOD OF IDENTIFYING CONTOUR LINES

BACKGROUND OF THE INVENTION

1. Field of Invention

This invention relates to a method of identifying a contour line of an object to be detected by using an image pick-up device, for example, a television camera.

2. Description of the Prior Art

Among prior art, methods of calculating the values of characteristic parameters of an object from a television picture image (a multivalue picture image) may be mentioned a region method and a contour line detection method.

According to the region method, the picture image is divided into a plurality of partial image regions each having substantially the same brightness and then the object is identified by judging the continuity of the regions on the assumption that respective surfaces of the object has similar brightness.

Although this method is effective for an object constituted by planes, when curved surfaces present, the processing thereof is difficult. Moreover, since all picture image data are processed, the amount of data becomes excessive, thus making it difficult a high speed processing.

On the other hand, the contour line extraction method utilizes the edges of respective surfaces of the object and according to this method, the points of the picture image at which the brightness changes rapidly are extracted as the edges, and the edges are connected together to convert them into a line picture. This method contemplates detection of lines in the picture image so that when compared with the region method which detects the surfaces, the number of detection stops and the quantity of informations for investigating their continuity are small so that high speed processing can be made.

The steps of identifying a circular body with the contour line extraction method will be described with reference to FIGS. 1a through 1d. At first, an original picture image (shown in FIG. 1a) photographed with a television camera is differentiated along respective scanning lines to extract a contour candidate point at which the brightness changes rapidly. Then, picture elements near this point are similarly differentiated and a picture elements having the maximum differentiated value is taken as a point continuous to the contour candidate point. This processing is repeated many times to obtain continuous contour points (contour line candidate)(see FIG. 1c) and when these contour points are closed (see FIG. 1d) they are deemed as an object.

According to this prior art contour extraction method, tracing of the contour candidate points are rendered difficult by the following factors.

(1) blooming caused by metal luster (see FIG. 2a),
(2) overlapping of object (see FIG. 2b),
(3) vague or not clear image caused by rust, spoil, etc. of the object surfaces,
(4) distortion of the picture image caused by electrical noise.

As a consequence, there is a defect that an actually presenting object would not be detected. Furthermore, identifying algorithm for solving these problems becomes complicated so that real time processing is almost impossible.

SUMMARY OF THE INVENTION

It is the principal object of this invention to provide a novel method of accurately identifying the contour line of a circle or an object having a configuration similar to a circle or a portion thereof by using a simple electric circuit and simple processing steps.

According to this invention, there is provided a method of identifying a contour line comprising the steps of presuming picture image data indicative of contour candidate points of an object to be detected based on picture image data representing the brightness of one picture in which the object presents, and scanning the picture image data in a predetermined region containing the picture image data so as to identify the contour line of the object.

According to a modified embodiment of this invention, there is provided a method of identifying a contour line comprising the steps of presuming picture image data indicative of a contour candidate point of an object to be detected based on picture image data representing the brightness of one picture in which the object presents, extracting, from the positions of the picture image data, picture image data of a plurality of picture elements including the contour candidate point, picture image data of a plurality of picture elements on the outside of the contour candidate point, and picture image data of a plurality of picture elements on the inside of the contour candidate point, determining average values of the brightness of the three picture image data; determining the differences between the mean values regarding adjacent contour candidate points, and identifying that the adjacent contour candidate points are continuous when one of the differences lies in a predetermined range.

BRIEF DESCRIPTION OF THE DRAWINGS

Further objects and advantages can be more fully understood from the following detailed description taken in conjunction with the accompanying drawings, in which.

DESCRIPTION OF THE PREFERRED EMBODIMENTS

A preferred embodiment of this invention will now be described with reference to the accompanying drawings.

Figure 1:
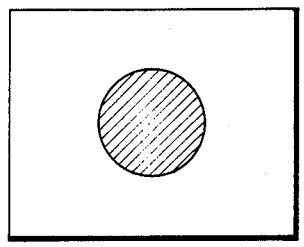
FIGS. 1a–1d are diagrammatic representations showing the steps of identifying an object according to a prior art method of contour extraction.
Figure 1:
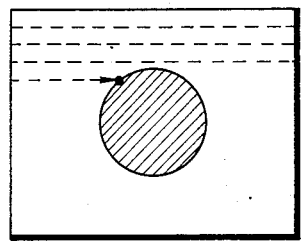
Figure 1:
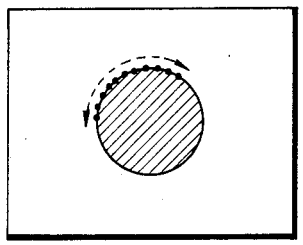
Figure 1:
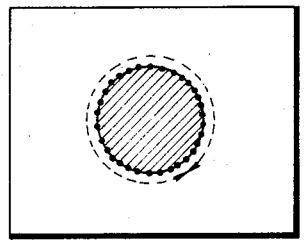
Figure 2:
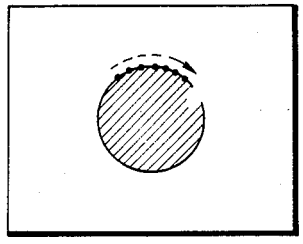
FIGS. 2a and 2b are diagrammatic representations showing one example of prior art factors that render difficulty to trace a contour line.
Figure 2:
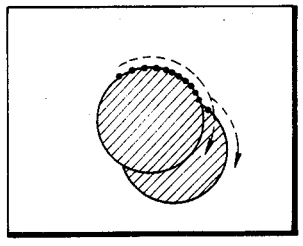
Figure 3:
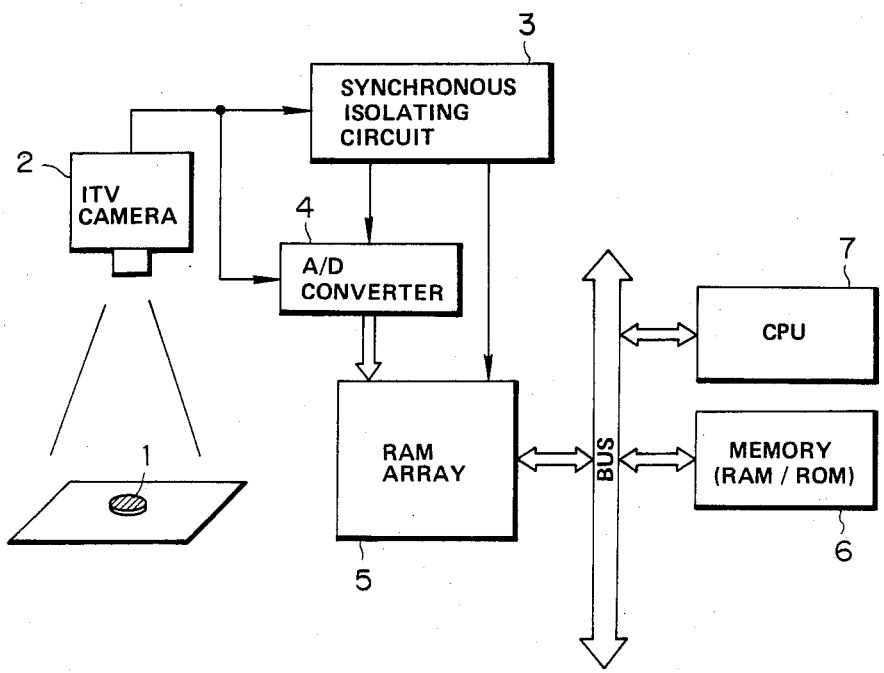
FIG. 3 is a block diagram showing one example of the apparatus utilized to carry out the method of identifying a substantially circular contour line according to this invention.
Figure 4:
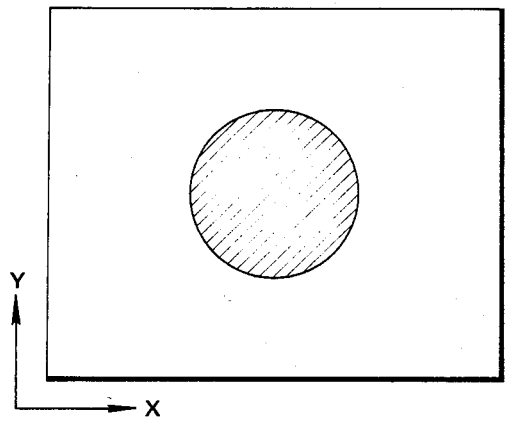
FIG. 4 shows the degree of brightness of a picture image data stored in the RAM array shown in FIG. 3.

It is assumed that an object to be detected is a circular body 1 shown in FIG. 3. An industrial television (ITV) camera 2 photographs the circular body or object in a predetermined field of view to send a video composite signal containing the brightness signal of the input picture image to a synchronous isolating circuit 3 and an A/D converter 4. The synchronous isolating circuit 3 operates to separate a synchronizing signal from the video composite signal. The synchronizing signal thus separated is used to designate an address of a random access memory array (RAM array) 5, while the A/D converter 4 converts the inputted video composite signal into a picture image data having 16 tones of brightness for writing the picture image data in the designated address. In this manner, picture image data corresponding to one picture and representing the brightness of the original picture shown in FIG. 4. Any desired picture image data can be read out by designating X and Y addresses of the RAM array 5.

Memory means 6 stores the main program or the like for carrying out the method of this invention, and a central processing unit (CPU) 7 executes the processing of the picture image data stored in the RAM array in accordance with the content of the main program.

The steps of processing executed by the CPU 7 will be described as follows with reference to the flow charts shown in FIGS. 5a and 5b and the diagrams shown in FIGS. 6a–6e.

Figure 5A:
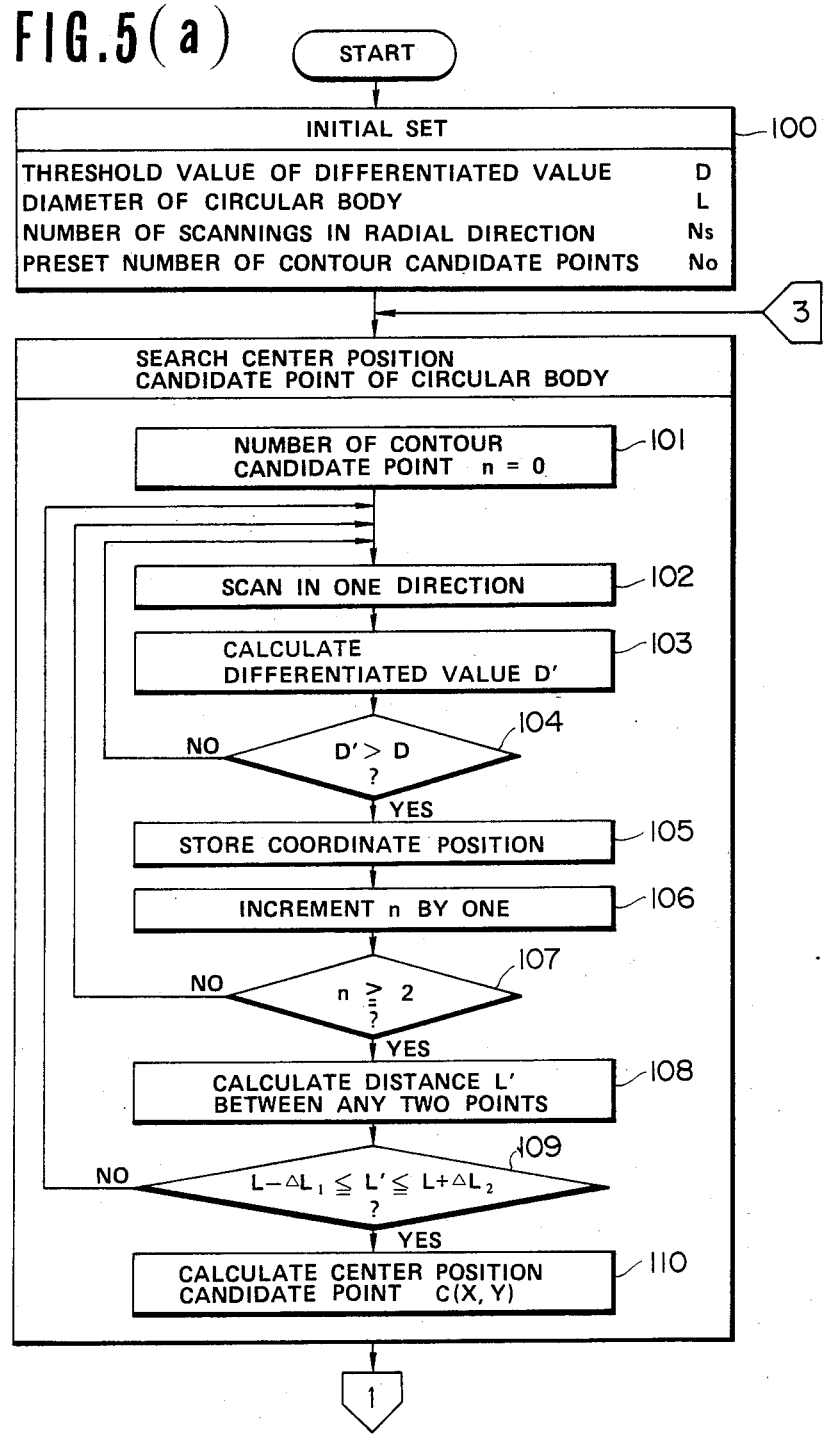
FIGS. 5a and 5b are flow charts showing one example of the steps of processing executed by the central processing unit shown in FIG. 3.

At step 100 shown in FIG. 5a, the threshold value D of the differentiated value, the diameter L of the circular body, the number of scannings Ns in the radial direction, and the present number No of the contour candidate point are set. The threshold value D is used to judge the contour candidate point at which the brightness of the picture image data varies rapidly. In this embodiment, the number of scanning is selected to be 8 and the number of presets No is selected to be 6.

After the initial setting has been completed, the present picture image data (see FIG. 6a) in the RAM array 5 is searched for finding out the center position candidate point of the circular body. The search of the center position candidate point is made by differentiating in the X direction. The picture image data stored in the RAM array 5, and based on the positions of respective contour candidate points when the spacing between two contour candidate points at which the brightness changes rapidly approaches the set diameter L.

More particularly, at step 101, the number n of the contour candidate points is set to zero, at step 102, the present picture image is scanned in the X direction, and at step 103, the differentiated value $D'$ of the picture image data is calculated. At step 104, a judgment is made as to whether the differentiated value $D'$ has exceeded the threshold value D or not. When the differentiated value $D'$ has exceeded the threshold value D, the coordinate position of $D'$ is stored at step 105, and at step 106 n is incremented by one. At step 107, a judgement is made as to whether n is equal to or larger than 2. When the result of this judgement is YES, at step 108 the distance $L'$ (see FIG. 6b) between any two stored points is calculated. Then at step 109, a judgment is made as to whether the distance $L'$ is close to the initially set diameter L or not. When the result of this judgment is YES, at step 110, the center position candidate point C (X,Y) (see FIG. 6c) is calculated by utilizing the coordinate positions of the two points. It should be understood that the method of searching the center positions candidate point is not limited to the illustrated embodiment. For example, a method can be used wherein more than three contour candidate points are determined so as to calculate the center position candidate point based on a circle passing through these three points.

Thereafter, the contour candidate point of the circular body is searched based on the center position candidate point of the circular body so as to check presence or absence of the contour line, that is, the circular body.

Figure 5B:
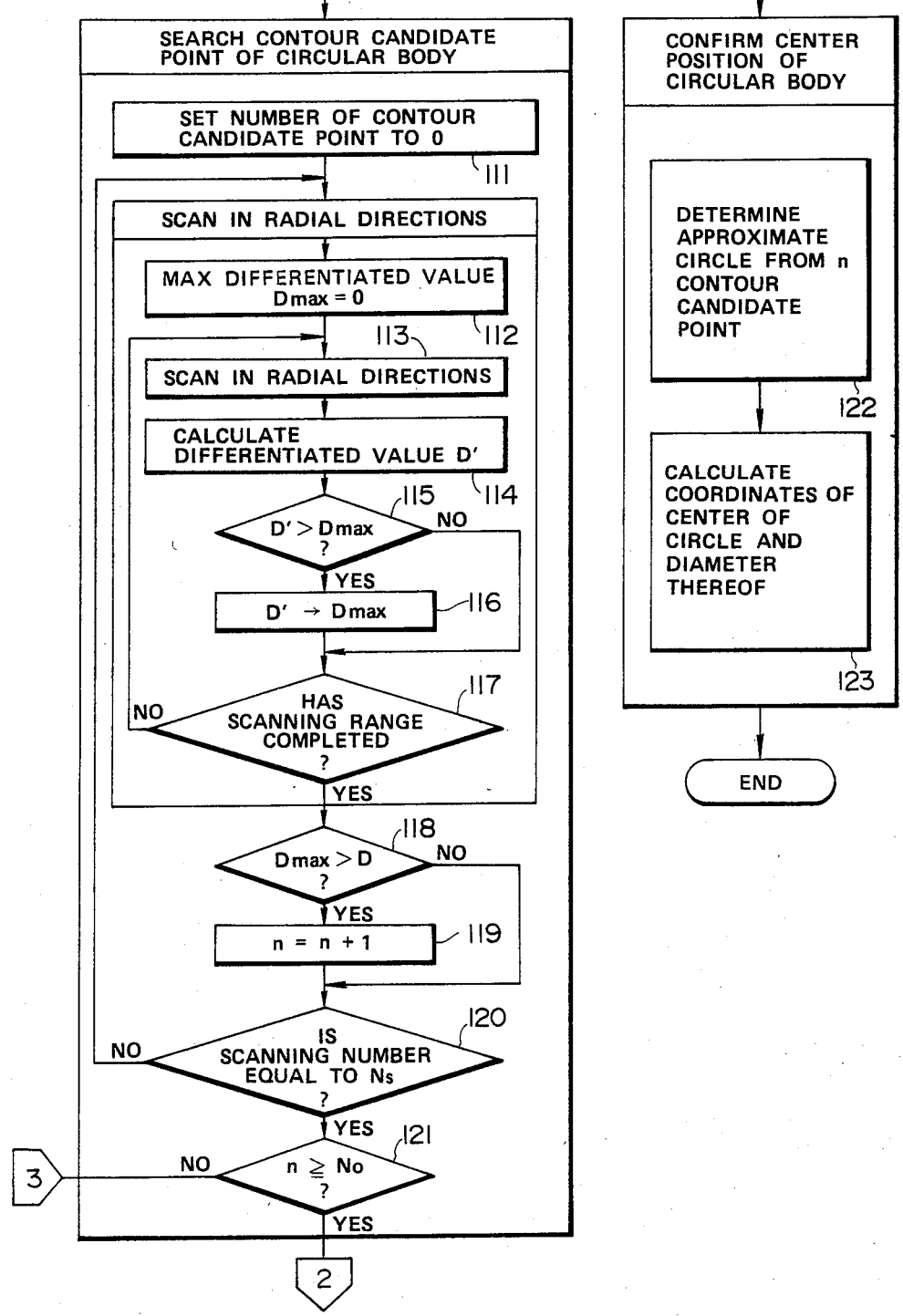
Figure 6:
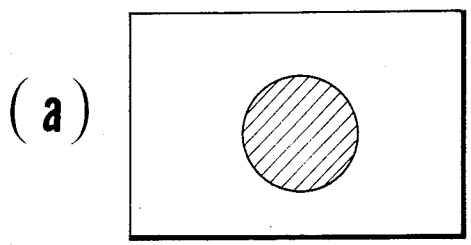
FIGS. 6a–6e are diagrams for explaining the steps of the flow charts shown in FIGS. 5a and 5b.
Figure 6:
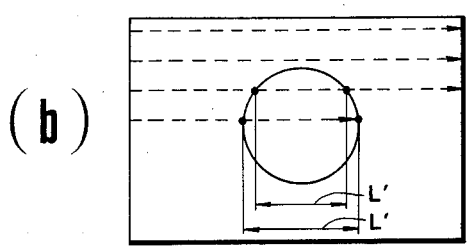
Figure 6:
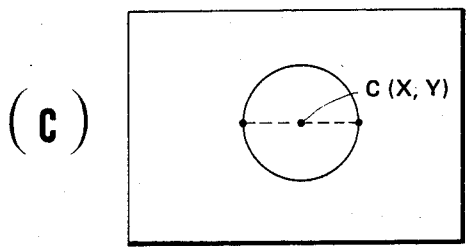
Figure 6:
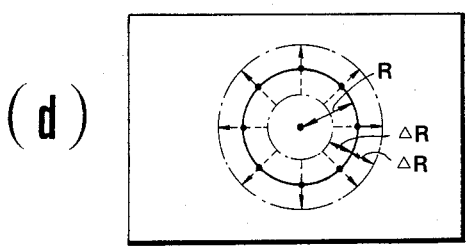
Figure 6:
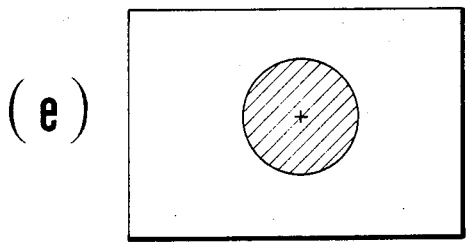

Referring now to FIG. 5b, at step 111, the number n of the contour candidate points is set to zero for scanning in a preset radial direction from the center position candidate point. Since the radius R (=L/2) of the circular body has been given the region to be scanned is limited to a doughnut shaped region bounded by a circle having a permissible minimum radius $(R-\Delta R)$, and a circle having a permissible maximum radius $(R+\Delta R)$. The preset scanning directions are 8, that is 0 (+X direction), $\pi/4$, $\pi/2$, $3\pi/4$, $\pi$, $5\pi/4$, $3\pi/2$ and $7\pi/4$ by taking the center position candidate point as the reference point (see FIG. 6d).

At the time of scanning in respective radial directions, the maximum differentiated value $D_{max}$ is set to zero at step 112. After that, at step 113, the scanning is made in either of the eight radial directions and at step 114, the differentiated value $D'$ of the picture image data is calculated. At step 115, a judgment is made as to whether the differentiated value $D'$ is larger than the maximum differentiated value $D_{max}$ or not. When the result is YES, at step 116, the differentiated value $D'$ is changed for the maximum differentiated value $D_{max}$ so that in the scanning range, all maximum differentiated values are changed to the maximum differentiated values. At step 117, a judgment is made whether the scanning in the range has completed or not. When the scanning has completed, at step 118, a judgment is made as to whether the maximum differentiated value $D_{max}$ has exceeded the threshold value D or not. When the result of judgment is YES, at step 119, the number n of the contour candidate point is incremented by one. After that, at step 120, a judgement is made as to whether the contour candidate point presents or not in the eight scanning directions. When the total number n of the contour candidate points is larger than the preset number No (in this example 6) of the contour candidate points, it is judged that the contour line of the circular body presents in the doughnut shaped region. On the other hand, when the total number n of the contour candidate points is less than the preset number No, the search of the center position candidate point of the circular body is performed again at step 121.

Finally, when the presence of the contour line of the circular body is recognized, at step 122, an approximate circle is determined from n contour candidate points, and at step 123, the coordinates of the center of the circle and, if desired, its diameter are calculated (see FIG. 6e), thus finishing the processing of the picture image.

When photographing a circular body with the ITV camera 2, where the center of the circular body is displaced from the ITV camera the resulting contour line is not a true circle but an ellipse. The method of this invention is also applicable to such a case. Furthermore, the invention is also applicable to a substantially circular body (an ellipse close to a circle or a polygon).

The number Ns of scannings in the radial direction, the direction of scanning, and the preset number No establishing the threshold value are not limited to those described above.

After the presence of the contour line of a circular body has been recognized, the continuity of the contour line is identified by the following method.

Figure 7:
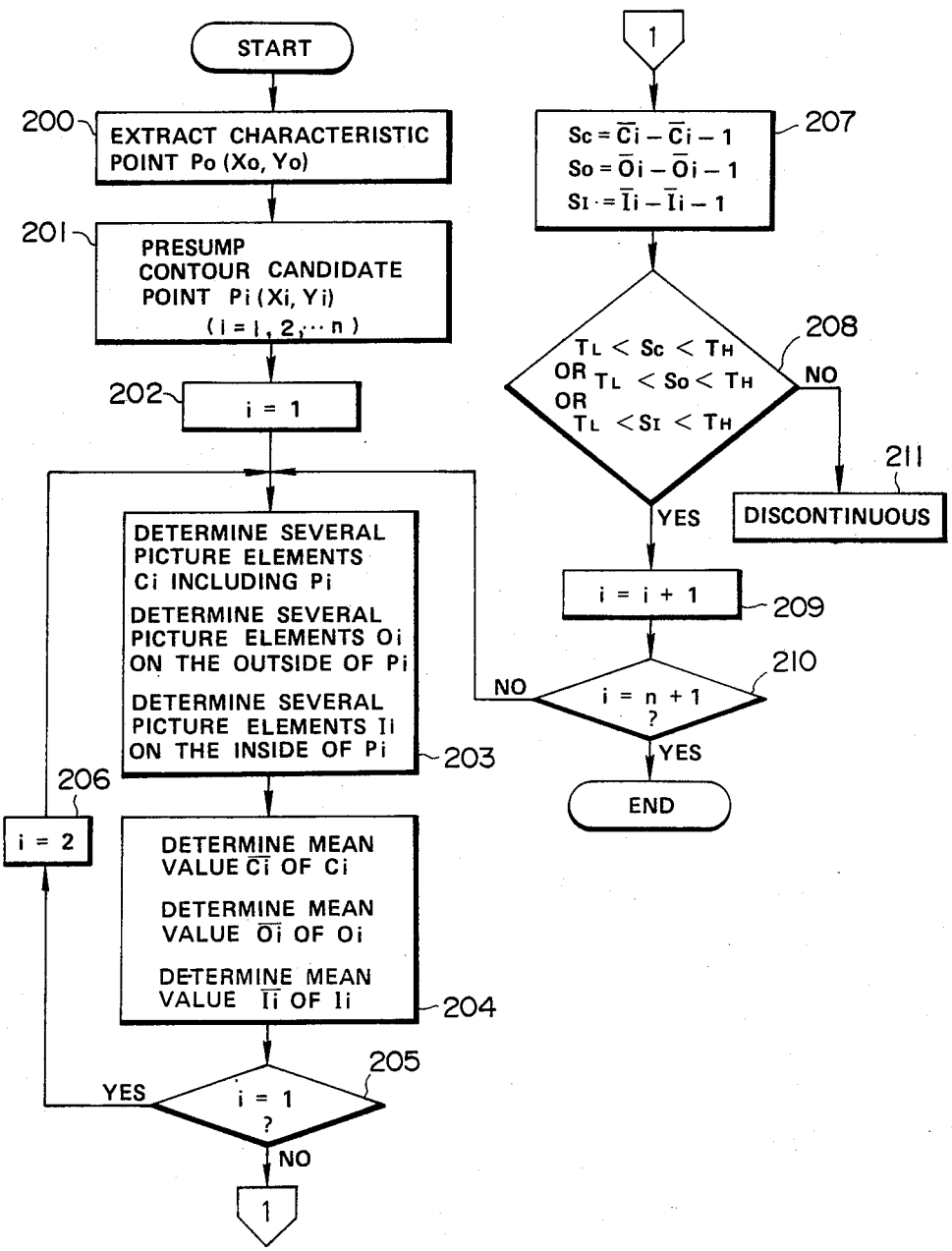
FIG. 7 is a flow chart showing successive steps of the processings executed by the central processing unit for identifying the continuity of the contour line.

FIG. 7 shows a flow chart indicative of the successive steps of the CPU 7 for identifying the continuity of the contour line. At step 200, characterizing points of an object to be detected are extracted from the present picture image data (see FIG. 8a) stored in the RAM array 5. In this example, since the object to be detected is assumed to be a circular body, as its characteristic point is detected—the center position Po (Xo, Yo) of the circle (see FIG. 8b). The method of detecting the characteristic point is not limited to that described above and the characteristic point can be detected by differentiating in the X direction the picture image data stored in the RAM array 5 so as to detect characteristic point based on the two contour candidate positions the spacing therebetween becoming the maximum and the brightness changes abruptly, or by determining more than three contour candidate points and then calculating the center position of a circle passing the three points.

Then at step 201, X contour candidate points are presumed from the characteristic point Po and the radius of the circle. For the sake of convenience, raspective contour candidate points are represented by Pi (i−1−n) (see FIG. 8c). Then at step 202, i is set to 1, and at step 203 several picture elements Ci including the contour candidate point Pi, several picture elements Oi on the outside of the contour candidate point Pi, and several picture elements Ii on the inner side of the contour candidate point Pi are extracted (see FIGS. 8c, 8d and 8e).

The extraction should be made such that the three types of the picture image data would be arranged in substantially normal direction with respect to the loci of the contour candidate points. The direction of $\psi$ of the normal is calculated by the following equation in accordance with the relative position between the characteristic point Po (Xo, Yo) and the contour candidate point Pi (Xi, Yi).

$$\psi = \tan^{-1} \frac{Yo - Yi}{Xo - Xi} \quad (1)$$

Figure 9:
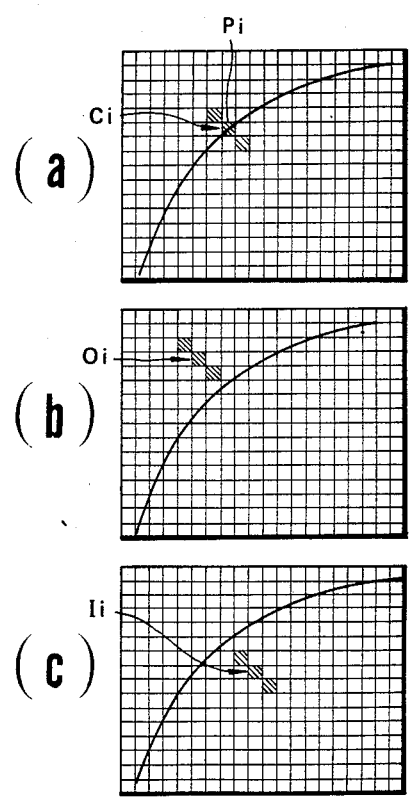
FIGS. 9a–9c respectively show one examples of several picture elements including a contour candidate point, several picture elements on the outside of the contour candidate point, and several picture elements on the inner side of the contour candidate point.

The picture elements are extracted based on this direction $\psi$. FIGS. 9a, 9b and 9c respectively show three picture elements Ci containing contour candidate point Pi, three picture elements Oi on the outside of the contour candidate point Pi and three picture elements Ii on the inside of the contour candidate point Pi.

At step 204, the mean values Ci, Oi and Ii of the brightness of the three types of the picture image data Ci, Oi and Ii are determined. After that at step 205, a judgment is made as to whether i is equal to one or not and when the result of judgment is YES, at step 206, i is made to be 2 to execute again the foregoing steps. When the result of judgment of step 205 is NO, the program sequence is advanced to stop 207 where the differences Sc, So and $S_I$ between the mean values Ci, Oi and Ii and Ci−1, Oi−1 and Ii−1 which are obtained at adjacent contour candidate points are calculated according to the following equations.

$$Sc = C_i - C_{i-1}$$

$$So = O_i - O_{i-1}$$

$$S_I = I_i - I_{i-1} \quad (2)$$

Figure 8:
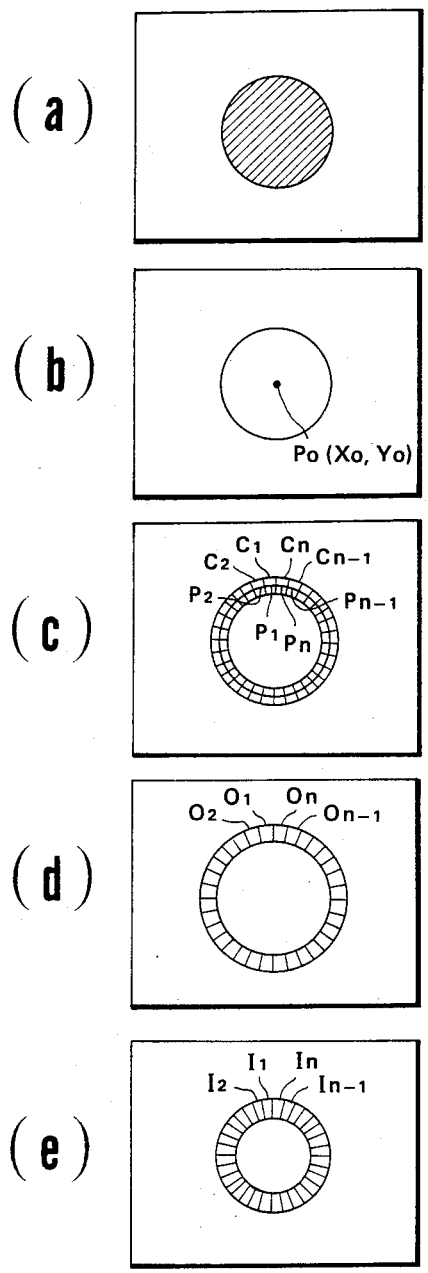
FIGS. 8a–8e are diagrams useful to explain the chart shown in FIG. 7.
Figure 10:
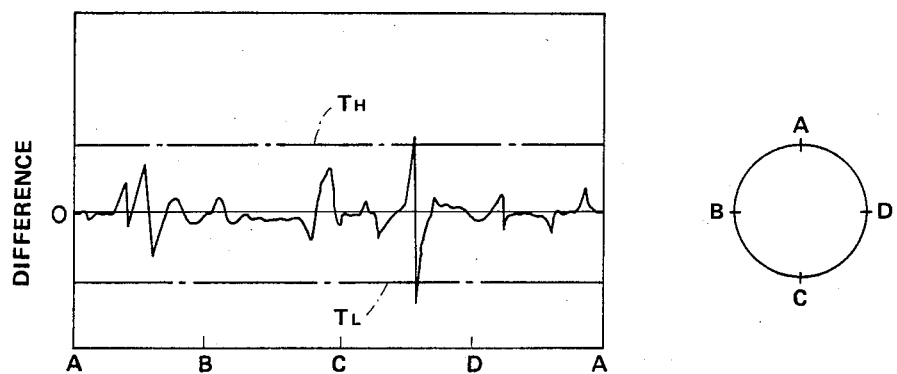
FIG. 10 is a graph showing one example of a mean value of the brightness along the entire periphery of the contour line.
Figure 10:
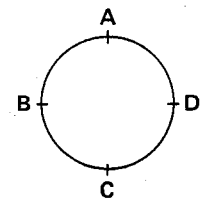

Then at step 208, a check is made as to whether the differences Sc, So and $S_I$ thus calculated are included in the permissible range (from the lower limit $T_L$ to the upper limit $T_H$) preset as shown in FIG. 10. When these differences are on the outside of the permissible range, it is judged that adjacent contour candidate points are discontinuous at step 211. However, when either one of the three differences lies in the permissible range, at step 208, it is judged that adjacent contour candidate points are continuous. More particularly, as shown in FIG. 8, between C and D, there is a point at which the difference goes out of the permissible range, but where either one of the other differences lies in the permissible range, it is judged that adjacent contour candidate points are continuous. Then, at step 209, i is incremented by one for the purpose of checking whether the next adjacent contour candidate points are continuous or discontinuous, thus executing again above described steps.

When the continuity of all contour candidate points is confirmed at step 210, the processing is terminated. In other word, it is now judged that the contour line is continuous to identify the object.

Figure 11:
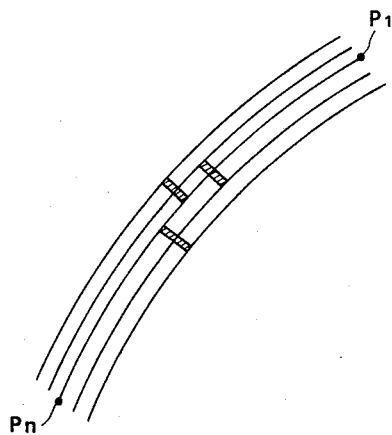
FIG. 11 shows another example of the contour candidate point.

The object to be detected is not limited to a circular body. The method of this invention is applicable to judge whether a portion of the contour line is continuous or not as shown in FIG. 11, provided that the contour candidate points are presumed by certain experiments.

What is claimed is:

1. A method of identifying a contour line comprising the steps of:

searching a center position candidate point of a substantially circular contour line among input picture images in a predetermined field of view in which said substantially circular contour line is present;

defining a region bounded by a circle having a center at said center position candidate point and a minimum permissible radius which is determined based on said searched center position candidate point and the radial distance from said point to the contour line, and a circle having a maximum permissible radius larger than said radial distance;

scanning picture images in said region in a plurality of radial directions extending from said center position candidate point;

detecting presence and absence of contour candidate points at which brightness changes abruptly during the scanning; and identifying that said substantially circular contour line is present in the picture images of said region when the number of said contour candidate points exceeds a predetermined set number.

2. The method according to claim 1 wherein said substantially circular contour line includes an ellipse close to a circle as well as a polygonal contour line.

3. The method according to claim 1 wherein said center position candidate point of said substantially circular contour line is detected by searching contour candidate points, recognizing that a distance between any two contour candidate points is substantially equal to the diameter of said substantially circular contour line to be identified.

4. The method according to claim 1 wherein the number of said radial scanning is 8 and said preset number is 6.

5. A method of identifying a contour line comprising the steps of:

presuming picture image data indicative of a contour candidate point of an object to be detected based on picture image data representing brightness of one picture in which said object is present;

extracting, from the positions of said picture image data, picture image data of a plurality of picture elements including said contour candidate point, picture image data of a plurality of picture elements on the outside of said contour candidate point, and picture image data of a plurality of picture elements on the inside of said contour candidate point;

determining a mean value of brightness of said three picture image data for successive contour condidate points;

determining differences between said mean values of adjacent contour candidate points; and identifying that said adjacent contour candidate points are continuous when one of said differences lies in a predetermined range.

6. The method according to claim 5 wherein, when said object to be detected is a circle, said picture image data representing said contour candidate point is presumed based on the center and radius of said circle.

* * * * *